United States Patent
Erb, Jr. et al.

(10) Patent No.: US 6,790,795 B2
(45) Date of Patent: Sep. 14, 2004

(54) FIRE BLOCKING FABRIC

(75) Inventors: David F. Erb, Jr., Readfield, ME (US); Eliza L. Montgomery, North Monmouth, ME (US); Eric D. Ritter, Monmouth, ME (US)

(73) Assignee: Tex Tech Industries, Inc., North Monmouth, ME (US)

( * ) Notice: Subject to any disclaimer, the term of this patent is extended or adjusted under 35 U.S.C. 154(b) by 0 days.

(21) Appl. No.: 10/084,225

(22) Filed: Feb. 28, 2002

(65) Prior Publication Data

US 2002/0182967 A1 Dec. 5, 2002

Related U.S. Application Data

(60) Provisional application No. 60/277,277, filed on Mar. 21, 2001.

(51) Int. Cl.[7] .......................... B32B 5/26; B32B 27/12; B32B 3/06
(52) U.S. Cl. .......................... 442/35; 442/43; 442/49; 442/82; 442/88; 442/402; 442/414; 428/99; 428/100; 428/920; 428/921
(58) Field of Search ................. 428/920, 921, 428/99, 100; 442/2, 35, 43, 49, 402, 414, 79, 82, 86, 88

(56) References Cited

U.S. PATENT DOCUMENTS

| | | | |
|---|---|---|---|
| 4,463,465 A | 8/1984 | Parker et al. | |
| 4,540,617 A | 9/1985 | Kawanishi et al. | |
| 4,743,495 A | 5/1988 | Lilani et al. | |
| 4,748,065 A | 5/1988 | Tanikella | |
| 4,750,443 A | 6/1988 | Blaustein et al. | |
| 4,780,359 A | 10/1988 | Trask et al. | |
| 4,865,906 A * | 9/1989 | Smith, Jr. .................. | 442/197 |
| 4,980,228 A | 12/1990 | LaMarca, II et al. | |
| 5,223,324 A | 6/1993 | McCullough, Jr. et al. | |
| 5,279,878 A | 1/1994 | Föttinger et al. | |
| 5,283,918 A | 2/1994 | Weingartner et al. | |
| 5,477,572 A | 12/1995 | Weingartner et al. | |
| 5,534,325 A | 7/1996 | Jörder et al. | |
| 5,632,053 A | 5/1997 | Weingartner et al. | |
| 6,040,252 A | 3/2000 | Ootuka et al. | |
| 6,383,623 B1 * | 5/2002 | Erb, Jr. .................... | 428/299.7 |

FOREIGN PATENT DOCUMENTS

| | | |
|---|---|---|
| EP | 0 202 996 B1 | 11/1986 |
| EP | 0 258 513 B1 | 3/1988 |
| EP | 0 425 075 B1 | 5/1991 |
| EP | 0 622 332 B1 | 2/1994 |
| EP | 0 731 760 B1 | 11/1994 |
| WO | WO 95/14587 | 6/1995 |
| WO | WO 99/38398 | 8/1999 |
| WO | WO 99/38399 | 8/1999 |

OTHER PUBLICATIONS

Gregory J. LaCasse, "Advanced Fibers for Non–Structural Applications", 32nd Intl. SAMPE Symposium, Apr. 4–9, 1987.

William C. Smith, "High Temperature Fibres, Fabrics, Markets—An Overview", Man–Mad Textile in India, Feb. 1994, pp. 47–55.

* cited by examiner

Primary Examiner—Ula C. Ruddock
(74) Attorney, Agent, or Firm—Fitzpatrick, Cella, Harper & Scinto

(57) ABSTRACT

A fire blocking material is disclosed comprising a nonwoven fabric including para-aramid fibers and pre-oxidized polyacrylonitrile, and optionally, a garnett of recycled polybenzimidazole, para-aramid or meta-aramid, or combinations thereof to form a fire blocking textile meeting Federal Aviation Administration regulation FAR 25.853 and Appendix F to Part 25.

8 Claims, 2 Drawing Sheets

FIRE BLOCKING FABRIC

BACKGROUND OF THE INVENTION

This application claims priority to U.S. provisional application 60/277,277, filed Mar. 21, 2001, herein incorporated by reference.

1. Field of the Invention

This invention relates to a fabric having fire blocking properties. The fabric is suited for use in many fire blocking applications, including as a fire blocking layer in aircraft seats, where it may be positioned between an outer dress covering and an inner foam core, so as to cover and protect the foam core. The fabric is also suited for automotive, bus, rail, or recreational vehicle applications.

2. Description of the Related Art

Title 14 of the U.S. Code of Federal Regulations contains the rules adopted by the Federal Government related to aviation and space. Federal aviation regulations related to airworthiness standards for transport category airplanes are contained in Part 25 of Title 14. Of particular interest in aircraft seating are rules and testing standards regarding aircraft compartment interiors, contained in Part 25.853 and Appendix F to Part 25 (2001). These rules pertaining to the flammability of cabin materials, herein incorporated by reference, are designed to minimize the loss of human life in the event of a post-crash fire.

In aircraft seating, the amount of protection that a fire blocking fabric must provide depends on the nature of the foam seat cushion it covers and on the outer dress cover material used, as disclosed for example in U.S. Pat. No. 4,750,443, herein incorporated by reference. Fabricated polyurethane cushions may require an additional level of protection compared with less dense molded cushions. The dress cover may be manufactured of a woven wool/nylon blend, woven nylon, or leather-covered. Of these, a 90%/10% wool/nylon blend is commonly used and requires the least amount of fire protection. Nylon dress coverings require additional protection, and leather-covered seats require the most fire protection.

An example of a commercially available fire blocking fabric is manufactured by Tex Tech Industries of North Monmouth, Me., and is available as Style #XD192:19R. This fabric has a mass per unit area of 10.0 oz/yd$^2$, and a thickness of 0.060 inches. The fabric is composed of at least 2 layers of nonwoven batts consisting of 100% polybenzimidazole (PBI) staple fibers, and a woven supporting scrim consisting of staple meta-aramid fibers and having a mass per unit area of 2.2 oz/yd$^2$.

This particular fabric is a superior fire blocker and meets Federal Aviation Administration (FAA) regulations concerning flame resistance in accordance with Federal Aviation Regulation (FAR) 25.853 and Appendix F to Part 25 for virtually all dress covers. Its performance is excellent in protecting leather-covered seats typically found in first class and crew seating applications. However, it is extremely costly to manufacture due to its weight and the high cost of its materials of construction.

Due to the high cost of PBI staple fibers, this particular fabric is not used on seats having the most common wool/nylon blend dress covers, as it provides far greater protection to the foam core of the seat cushion than is required by FAA regulations.

U.S. Pat. No. 5,534,325 (Jorder, et al.), herein incorporated by reference, discloses a flame barrier comprising nonwoven fabric containing staple fibers made of phenolic resin, para-aramid or melamine resin, alone or in combination with 20 to 60 percent by weight pre-oxidized polyacrylonitrile (pre-ox PAN). The fabric also contains 15 to 30 percent by weight vermiculite, an inorganic filler, dispersed throughout its volume. Para- or meta-aramid filaments can be anchored in the nonwoven fabric with a tricot weave or using a stitchbonding process, described in U.S. Pat. No. 5,279,878, also incorporated by reference herein. However, the process of dispersing vermiculite in a nonwoven fabric is difficult, costly, and hard to control and loose particles of vermiculite may pose a concern after extended seat wear.

U.S. Pat. No. 4,540,617 (Kawanishi et al.), herein incorporated by reference, discloses a woven fabric of semi-carbon fibers and para-oriented aromatic polyamide having a silicone resin coating on at least one surface. The coating also contains inorganic filler. Typically, coated fabrics like the one disclosed in this patent evolve amounts of smoke and fumes which may be toxic to passengers in a cabin fire. The coating also adds additional expense to the product.

SUMMARY OF THE INVENTION

An object of the present invention is to provide a less expensive fire-blocking fabric that meets Federal Aviation Administration regulations for flammability resistance in accordance with FAR 25.853 and Appendix F to Part 25, regardless of the seat cushion and dress cover construction.

A further object is to provide a more durable fabric that exceeds established mechanical wear resistance requirements of Boeing Aircraft Company standard BSS 7302 Seat Wear Test for Upholstery Fabrics and Fireblocking Layers, commonly known as the "Squirmin' Herman" test.

Yet another object is to provide a fabric having some water and stain repellency.

Preferred fire blocking fabrics according to the invention comprise about 10 to about 90 percent by weight para-aramid fibers and about 10 to about 90 percent by weight preoxidized polyacrylonitrile fibers (pre-ox PAN) in a needlepunched nonwoven layer.

The nonwoven needlepunched fabric layers according to the invention may also include up to about 35 percent by weight of recycled polybenzimidazole, para-aramid, meta-aramid fibers, or combinations thereof (garnett). A garnett is a staple length or chopped fiber recovered from fabric or yarn via a coarse carding operation. Carding, in turn is a process by which staple fibers are sorted, separated and partially aligned.

In preferred embodiments, the nonwoven needlepunched fabric layers according to the invention contain in the range of about 30–60 percent by weight staple para-aramid fibers, in the range of about 10–40 percent by weight pre-ox PAN, and in the range of about 5 and about 35 percent by weight of a garnett comprising recycled polybenzimidazole, para-aramid, meta-aramid fibers, or combinations thereof.

The fireblocking fabric according to the invention may comprise a single batting layer of the above-described nonwoven material or two or more such batting layers stitched or otherwise mechanically held together. The batting layers each have a weight in the range of about 1.0 to about 12.0 ounces per square yard. The thickness of the finished fabric in either case ranges between about 0.020 inches up to about 0.150 inches and has a mass per unit area between about 3.0 and about 14.0 ounces per square yard.

In preferred embodiments the above-described nonwoven fabric is combined with a relatively loosely woven scrim on one side to make a fire blocking fabric. In some instances two adjacent layers of woven scrim having a different composition can be used, such as a woven glass and a polyester. In some instances, layers of scrim can be incorporated between nonwoven fabric layers in the finished fire blocking fabric.

Preferred nonwoven fabric layers and finished fire blocking fabrics according to the invention generally meet the standards of flame resistance set forth in FAR 25.853 without added flame resistant coatings (such as silicone resin coatings), or the addition of inorganic fillers. In particularly preferred embodiments, the nonwoven fabrics according to the invention do not contain inorganic fillers. However, in preferred embodiments, a fluoropolymer coating on the fabric, or on the individual fabric layers, imparts water repellency and stain-proofing.

Further objects and advantages of this invention will become apparent from a consideration of the drawings and description of the preferred embodiments.

DETAILED DESCRIPTION OF THE PREFERRED EMBODIMENTS

Figure 1:
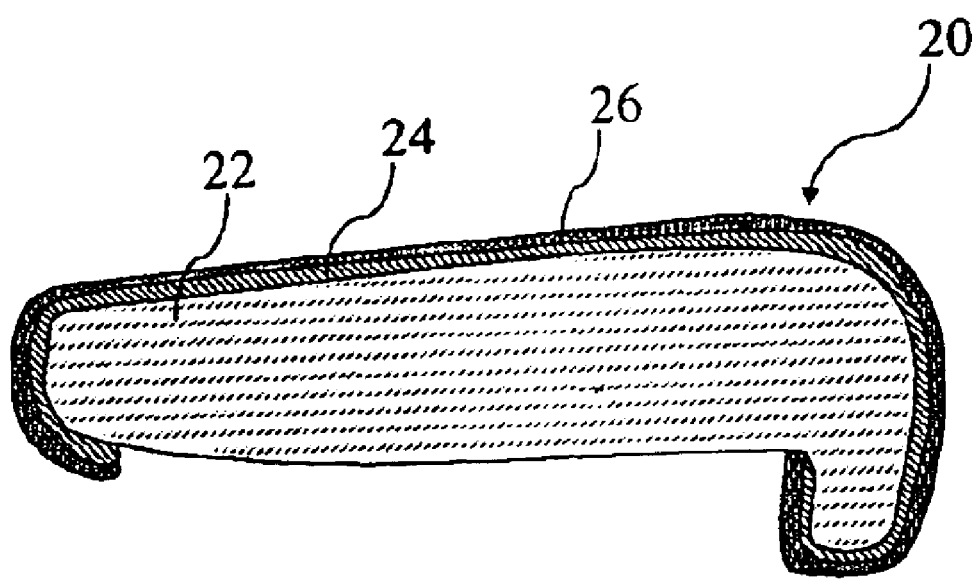
FIG. 1 is a cross sectional side view of an aircraft seat cushion bottom incorporating a fire blocking fabric of the invention.

Referring to FIG. 1, the general construction of a fire-protected aircraft seat cushion bottom (20) is shown. A combustible seat cushion bottom (22) is composed of a foam cushion and a thin woven fabric cover (not shown) which completely surrounds the foam cushion. The fabric cover is glued to the foam cushion, and allows for attachment of hook- and -loop type fasteners to the foam cushion button. A fire blocking fabric (24) covers the combustible seat cushion bottom (22). The fire blocking fabric (24) is attached to the seat cushion bottom by attachment means, including but not limited to hook- and -loop type fasteners, stitching, buttons, snaps, or adhesives so that it covers at least a portion of the combustible seat cushion that may be directly exposed to flames. Generally, the fire blocking fabric (24) covers the seat cushion completely with the exception of the bottom of the cushion, which would not be directly exposed to flames in the event of a fire. A decorative outer dress cover material (26) commonly made of a wool/nylon blend but sometimes made of leather, completely covers the fire blocking fabric. The dress cover material (26) is attached to the fire blocking fabric with hook and loop type fasteners or other attachment means including, without limitation, stitching, buttons, snaps or adhesives. The foam cushion (20), including the woven fabric cover, the fire blocking layer (24), and the dress cover (26) together comprise the fire-protected seat cushion bottom. A seat cushion back is constructed similarly to the seat cushion bottom.

Figure 2:
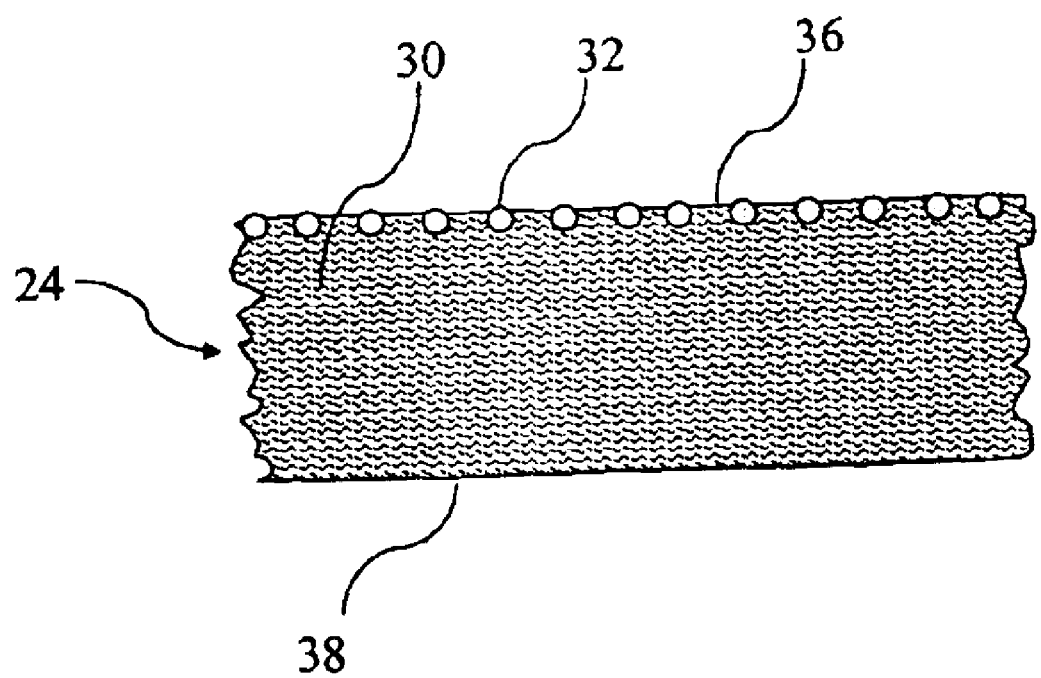
FIG. 2 is a cross-sectional side view of a fire blocking textile layer having a woven supporting scrim on one side.
Figure 3:
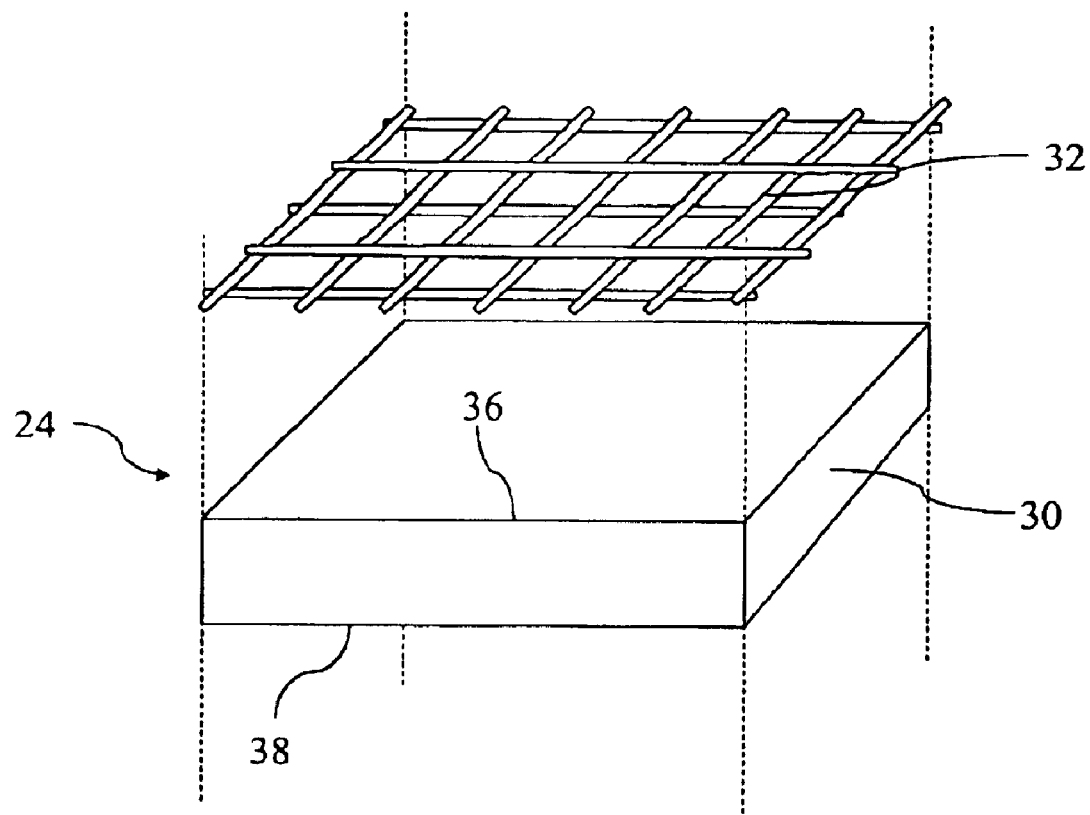
FIG. 3 is an exploded perspective view of a fire blocking textile layer having a woven supporting scrim on one side.

Referring to FIG. 2 and 3, the fire blocking fabric (24) includes at least one nonwoven fabric layer (30) containing staple fibers of para-aramid and preoxidized polyacrylonitrile (pre-ox PAN). The mass per unit area of the finished fabric ranges between about 100 g/m$^2$ to about 475 g/m$^2$ (3.0-14.0 oz/yd$^2$). In preferred embodiments, the nonwoven fabric layer (30) further includes a garnett comprising recycled polybenzimidazole, para-aramid, meta-aramid fibers or a combination thereof.

Para-aramid fibers comprise approximately 10 to 90 percent by weight of the nonwoven fabric layer (30), while pre-ox PAN fibers constitute approximately 10 to 90 percent by weight. The polybenzimidazole component, if it is included may constitute as little as about 1 or 2 percent by weight to approximately 35 percent by weight, preferably between about 5 and about 31 percent by weight. Para-aramid staple fibers are available as Kevlar® from E. I. Du Pont; as Technora® from Teijin; or as Twaron® from Teijin Twaron. Pre-ox PAN staple fibers are available as Panox® from SGL or as Lastan® from Asahikasei Corporation of Japan. Polybenzimidazole staple fibers are available as PBI® from Celanese Acetate.

Pre-ox PAN staple fibers commonly range from 0.7–4.5 denier, in lengths up to approximately 6 inches. Para-aramid staple fibers typically range from 1 to 5 denier, in lengths up to about 4 inches. Polybenzimidazole staple fibers are typically available as 1.5 denier, in cut lengths up to 4 inches. However, any available fiber denier/staple length may be used.

The nonwoven fabric layer (30) is generally supported by at least one woven scrim (32). The nonwoven fabric layer and the woven scrim or scrims together constitute the composite fire blocking fabric (24). The fire blocking fabric (24) is depicted in FIG. 2 as having a first face (36) where the scrim is incorporated, and an opposite second face (38). In embodiments, however, the fire blocking fabric according to the invention may incorporate multiple layers of scrim material and multiple nonwoven fabric layers. The scrim (32) may be comprised of meta-aramid fibers, such as Nomex® (available from E. I. Du Pont) or Conex® (available from Teijin/Aramid Limited) in the weight range of 1.0 to 4.0 oz/yd$^2$. It may also be advantageous to use other reinforcements such as woven blended yarns, multifilament woven glass, thermoplastic monofilament yarns, and other similar materials typically used in the reinforcement of nonwoven fabrics.

The nonwoven needlepunched fabric layer is preferably saturated with a treatment as a means for imparting water and stain repellency to the fabric. The surface treatment consists of a fluoropolymer, such as Zonyl® RN® available from Du Pont or Scotchguard® available from 3M. This treatment is applied using a conventional textile padding process known to those of ordinary skill in the art, and is subsequently dried and cured.

It is believed that needlepunching results in a denser, more durable and more flame resistant fabric layer than other known methods of preparing a nonwoven fabric, such as hydroentanglement. Needlepunching is a method of making nonwoven fabrics that utilizes barbed needles to entangle fibers into a web. Needlepunching processes are disclosed, for example, in U.S. Pat. Nos. 4,062,993, 3,415,713, and 3,428,506, herein incorporated by reference.

The following Examples prepared according to the invention are not to be understood as limiting the invention to the specific embodiments described.

EXAMPLE 1

A nonwoven fabric layer was prepared having a mass per unit area of the fabric of 264.5 g/m$^2$ (7.8 oz/yd$^2$), and a thickness of 1.52 mm (0.060 in.). The nonwoven needlefelted fabric comprised a blend of staple and recycled (garnett) fibers in the following approximate percentages, by weight:

| Fiber | Wt % |
|---|---|
| P-aramid staple fibers<br>1.5 denier × 60 mm (2.36 in.) long | 57% |
| Pre-ox PAN staple fibers<br>2 denier × 76 mm (3.0 in.) long | 38% |
| PBI/para-aramid/meta-aramid garnett | 5% |

A scrim woven of 100% Conex® meta-aramid yarn using a plain weave was mechanically entangled to one side of the nonwoven fabric by needlepunching. The mass per unit area of the scrim was 71.2 g/m$^2$ (2.1 oz/yd) with a construction of 22 ends per inch and 14 picks per inch.

The finished fire blocking fabric was found to meet FAA regulations concerning flame resistance in accordance with FAR 25.853 and Appendix F to part 25. This fabric is available from Tex Tech Industries, Inc., North Monmouth, Me., as style 7535R.

EXAMPLE 2

A nonwoven fabric layer was prepared having a mass per unit area of 210 g/m$^2$ (6.2 oz/yd$^2$), and a thickness of 1.47 mm (0.058 in.). The nonwoven needlefelted fabric comprised a blend of staple and recycled (garnett) fibers in the following approximate percentages, by weight:

| Fiber | Wt. % |
|---|---|
| P-aramid staple fibers<br>1.5 denier × 60 mm (2.36 in.) long | 31% |
| Pre-ox PAN staple fibers<br>2 denier × 76 mm (3.0 in.) long | 38% |
| PBI/para-aramid/meta-aramid garnett | 31% |

A scrim woven of 100% Nomex® meta-aramid yarn using a plain weave was applied to one side of the nonwoven fabric. The mass per unit area of the scrim was 47.5 g/m$^2$ (1.4 oz/yd$^2$) with a construction of 22 ends per inch and 14 picks per inch.

A fluoropolymer treatment was applied consisting of 2.5weight percent Zonyl® RN®, available from E. I. du Pont, and 97.5 weight percent water. Wet pickup was 100% based on the weight of the fabric. The fabric was subsequently dried and cured at a temperature from 350 to 425 degrees Fahrenheit for about 5 to about 20 minutes.

The finished fire blocking fabric was found to meet FAA regulations concerning flame resistance in accordance with FAR 25.853 and Appendix F to part 25. This fabric is available from Tex Tech Industries, Inc., North Monmouth, Me., as style MC8-7725R.

EXAMPLE 3

A nonwoven fabric layer was prepared having a mass per unit area of the fabric is 234 g/m$^2$ (6.9 oz/yd$^2$), and a thickness is 1.47 mm (0.058 in.). The nonwoven needlefelted fabric comprised a blend of staple and recycled (garnett) fibers in the following percentages, by weight:

| Fiber | Wt. % |
|---|---|
| P-aramid staple fibers<br>1.5 denier × 60 mm (2.36 in.) long | 31% |
| Pre-ox PAN staple fibers<br>2 denier × 76 mm (3.0 in.) long | 38% |
| PBI/para-aramid/meta-aramid garnett | 31% |

A scrim woven of 100% Nomex® meta-aramid yarn using a plain weave was applied to one side of the nonwoven fabric. The mass per unit area of the scrim was 47.5 g/m$^2$ (1.4 oz/yd$^2$) with a construction of 22 ends per inch and 14 picks per inch.

This fabric is available from Tex Tech Industries, Inc., North Monmouth, Me., as style 7726R.

EXAMPLE 4

The mass per unit area of the fabric is 407 g/m$^2$ (12.0 oz/yd$^2$), and its thickness is 2.03 mm (0.080 in.). The nonwoven needlefelted fabric consists of a blend of staple and recycled (garnett) fibers in the following percentages, by weight:

| Fiber | Wt. % |
|---|---|
| P-aramid staple fibers<br>1.5 denier × 60 mm (2.36 in.) long | 50% |
| Pre-ox PAN staple fibers<br>2 denier × 76 mm (3.0 in.) long | 40% |
| PBI/para-aramid/meta-aramid garnett | 10% |

A woven glass scrim is positioned between the layers of the nonwoven fabric. The mass per unit area of the scrim is 78.0 g/m$^2$ (2.3 oz/yd$^2$) with a construction of 30 ends per inch and 28 picks per inch.

EXAMPLE 5

The mass per unit area of the fabric is 210 g/m$^2$ (6.2 oz/yd$^2$), and its thickness is 1.47 mm (0.058 in.). The nonwoven needlefelted fabric consists of a blend of staple and recycled (garnett) fibers in the following approximate percentages, by weight:

| Fiber | Wt. % |
|---|---|
| P-aramid staple fibers<br>1.5 denier × 60 mm (2.36 in.) long | 31% |
| Pre-ox PAN staple fibers<br>2 denier × 76 mm (3.0 in.) long | 38% |
| PBI/para-aramid/meta-aramid garnett | 31% |

A scrim woven of 100% Nomex® yarn using a plain weave is applied to both sides of the nonwoven fabric. The mass per unit area of each scrim is 47.5 g/m$^2$ (1.4 oz/yd$^2$) with a construction of 22 ends per inch and 14 picks per inch.

A fluoropolymer treatment is applied consisting of 2.5 weight percent Zonyl® RN, available from Du Pont, and 97.5 weight percent water. Wet pickup is 100% based on the weight of the fabric. The fabric is subsequently dried and cured at a temperature from 350 to 425 degrees Fahrenheit for from 5 to 20 minutes.

EXAMPLE 6

The mass per unit area of the fabric is 170 g/m² (5.0 oz/yd²), and its thickness is 1.19 mm (0.047 in.). The nonwoven needlefelted fabric consists of a blend of staple and recycled (garnett) fibers in the following approximate percentages, by weight:

| Fiber | Wt. % |
| --- | --- |
| P-aramid staple fibers<br>1.5 denier × 60 mm (2.36 in.) long | 31% |
| Pre-ox PAN staple fibers<br>2 denier × 76 mm (3.0 in.) long | 38% |
| PBI/para-aramid/meta-aramid garnett | 31% |

Two woven scrims are place intimately together against one side of the nonwoven fabric and then mechanically needled through the nonwoven fabric. The scrim placed against the felted fabric is woven of 100% polyester yarn using a plain weave. The mass per unit area of the polyester scrim is 50.9 g/m² (1.5 oz/yd²) with a construction of 25 ends per inch and 14 picks per inch. A second scrim is woven of 100% glass fiber yarn using a plain weave is positioned on top of the polyester scrim. The mass per unit area of the glass scrim is 78.0 g/m² (2.3 oz/yd²) with a construction of 30 ends per inch and 28 picks per inch.

A fluoropolymer treatment is applied consisting of 2.5 weight percent Zonyl® RN, available from Du Pont, and 97.5 weight percent water. Wet pickup is 100% based on the weight of the fabric. The fabric is subsequently dried and cured at a temperature from 350 to 425 degrees Fahrenheit for from 5 to 20 minutes.

The fireblocking fabrics described in Examples 1 and 2 were tested in accordance with FAR 25.853 and Appendix F to Part 25. Both Examples 1 and 2 passed the flammability test and the aircraft seat burn test requirements of this regulation. The results of the flammability and aircraft seat burn test are summarized below in Table 1 and Table 2.

TABLE 1

Flammability Test Data in Accordance with FAR 25.853 (a)
Appendix F to Part 25. Part I(a) (1) (ii)
12 second ignition vertical burn

| Test Requirements | Example 1 | Example 2 |
| --- | --- | --- |
| Extinguish time<br>(15 seconds maximum) | 1.2 | 1.1 |
| Burn length<br>(8 inches maximum) | 0.1 | 0.2 |
| Extinguish time of drippings<br>(5 seconds maximum) | 0.0 | 0.0 |
| Pass/Fail Summary | Pass | Pass |

TABLE 2

Aircraft Seat Burn Test Data in Accordance
with FAR 25.853 (c)
Appendix F to Part 25, Part II

| Test Requirements | Example 1 | Example 2 | Example 2 |
| --- | --- | --- | --- |
| Weight loss<br>(average ≦ 10 percent) | 6.30 | 7.29 | 4.1 |
| Burn length<br>(2 of 3 ≦ 17 inches) | yes | yes | Yes |
| Dress cover material<br>(full cover) | Leather | 90%/10%<br>wool/nylon blend | Leather |
| Pass/Fail Summary | Pass | Pass | Pass |

The fireblocking fabrics described in Example 1 and Example 2 were tested according to Boeing standard BSS 7302 Seat Wear Test for Upholstery Fabrics and Fireblocking Layers (Squirmin' Herman Test), herein incorporated by reference. The seat wear tests were run for 100 hours using wool upholstery dress covers and the fireblocking fabrics of Example 1 and 2. The dress covers and fireblocking fabrics were sewn to the seat cushion by Boeing. Both fireblocking fabrics passed the 100-hour Seat Wear Test per Boeing standard BSS 7302 for Upholstery Fabrics and Fireblocking Layers. No yarn breaks or holes in the fireblocking fabrics were observed after the duration of the test.

The fireblocking fabric was also tested for water repellency according to the following method. Three small (3/16 inch) drops of a test liquid consisting of 70% distilled water and 30% isopropyl alcohol are dispensed from a pipette onto two different locations on the fabric sample, making sure that the drops do not touch one another and the pipette tip does not touch the fabric. The sample is observed for 10 seconds to determine if the test fluid wets the fabric. The fabric is judged to have adequate repellency if after 10 seconds, not more than one of the six drops of test fluid has penetrated or wet the felt.

The fireblocking fabric described in Example 2 was tested and found to have adequate water repellency according to the method previously described.

All of the foregoing examples are for the purposes of illustration only and are not to be considered limiting of the invention defined by the appended claims.

We claim:

1. A fireblocking aircraft seat cushion covering comprising,
    a fabric cover for position directly adjacent an aircraft seat cushion;
    a fireblocking fabric comprising a mechanically entangled woven scrim and at least one nonwoven layer comprising 10 to about 90 percent by weight staple para-aramid fibers and about 90 to about 10 percent by weight pre-oxidized polyacrylonitrile fibers in a needlepunched nonwoven layer directly adjacent said fabric cover, said nonwoven layer having a mass per unit area of 210 g/m² or greater; and
    a dress cover,
    wherein said fireblocking fabric does not contain mineral filler.

2. The seat cushion covering of claim 1, wherein said fabric cover is woven.

3. The seat cushion covering of claim 1, wherein said dress cover is positioned directly adjacent said fireblocking fabric.

4. The covering of claim 1, wherein said scrim is woven meta- aramid yarn, and said dress cover is fabric or leather.

5. The covering of claim 1, wherein at least said nonwoven fabric layer has been treated with a fluoropolymer to impart water repellency.

6. The covering of claim 1, wherein said fabric cover is provided with hook- and -loop fasteners.

7. The covering of claim 1, wherein said fireblocking fabric is provided with hook- and -loop fasteners.

8. The covering of claim 1, wherein said fireblocking fabric comprises about 30 to about 60 percent by weight para-aramid fibers, about 10 to about 40 percent by weight pre-oxidized polyacrylonitrile fibers and about 5 to about 35 percent by weight of a garnett consisting of recycled polybenzimidazole fibers, para-aramid fibers, meta-aramid fibers, or mixtures thereof in at least one needlepunched nonwoven layer.

* * * * *